April 28, 1931.     A. K. STOHL     1,802,846
POWER TRANSMITTING MECHANISM
Filed March 24, 1930     4 Sheets-Sheet 1

Inventor
Andrew K. Stohl,
By
Attorney

Inventor
Andrew K. Stohl,

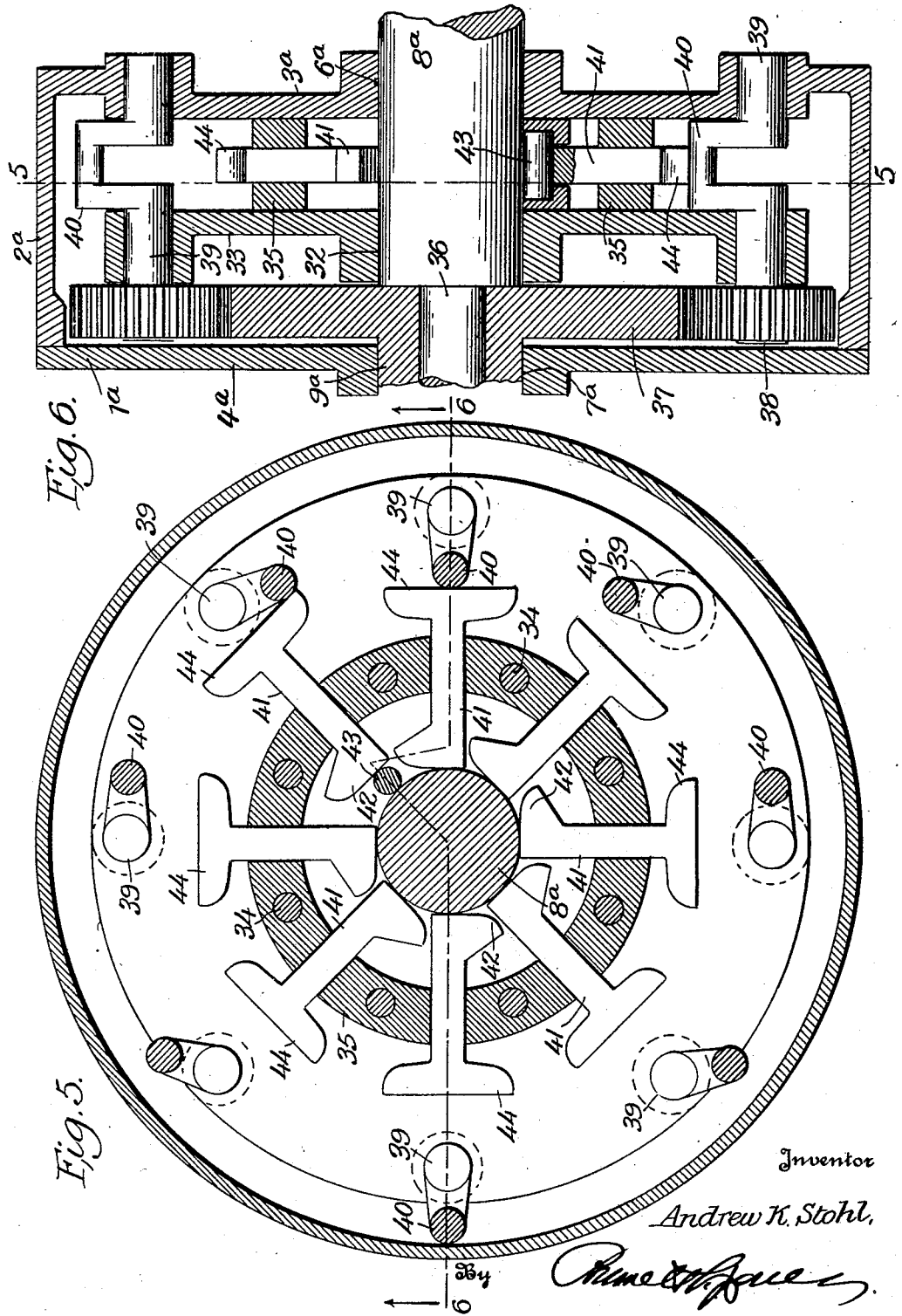

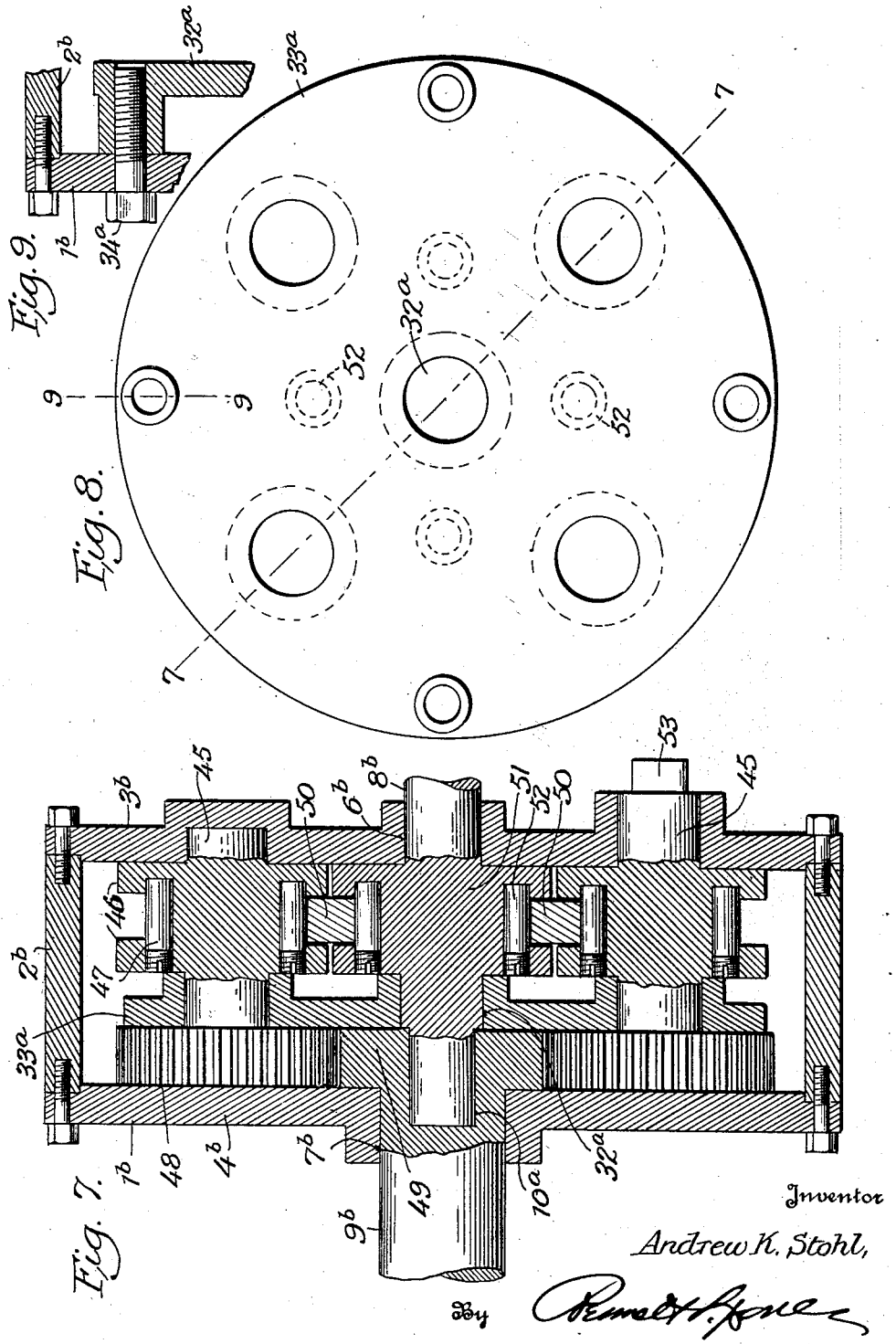

Patented Apr. 28, 1931

1,802,846

UNITED STATES PATENT OFFICE

ANDREW K. STOHL, OF WATERBURY, CONNECTICUT, ASSIGNOR, BY DIRECT AND MESNE ASSIGNMENTS, TO STOHL SUPER POWER CORPORATION, OF FAIR HAVEN, VERMONT, A CORPORATION OF VERMONT

POWER-TRANSMITTING MECHANISM

Application filed March 24, 1930. Serial No. 438,421.

This invention relates to power transmission mechanisms, and has for its primary object to provide a power transmission mechanism for use in transmitting power from a primary drive shaft to a driven shaft through an intermittent drive gearing of novel type, whereby a powerful and efficient driving action is obtained.

Another object of the invention is to provide a power mechanism for transmitting power from a drive shaft to a driven shaft in such manner as to effect a double driving action from one shaft to the other through a positive and continuous driving connection between the shafts and also through an intermittent or periodic driving connection between the shafts, which driving connections so coact as to supplement each other, whereby any transmission losses due to slippage, torque or other causes in the transmission of power through the positive driving connection will be compensated for or augmented by the forces transmitted by the intermittent drive gearing, so that increased power and, if desired, increased speed may be obtained.

Still another object of the invention is to provide an intermittent drive mechanism of radially movable cam lever and rotary crank type whereby a power drive varying to any degree desired in its time periods of action and in the forces transmitted thereby may be produced.

The invention consists of the features of construction, combination and arrangement of parts, hereinafter fully described and claimed, reference being had to the accompanying drawings, in which:—

Fig. 5 is a section on line 5—5 of Fig. 6 illustrating a modified form of the power transmitting mechanism.

Fig. 6 is a section on line 6—6 of Fig. 5.

Fig. 7 is a sectional view similar to Figs. 1 and 5 showing another modified form of the power transmitting mechanism, the plane of section being on line 7—7 of Fig. 8.

Fig. 8 is an outer face view of the division plate.

Fig. 9 is a fragmentary detail section through the division plate and one of the side plates, showing the manner of connecting the former to and supporting it from the latter.

Figure 1:
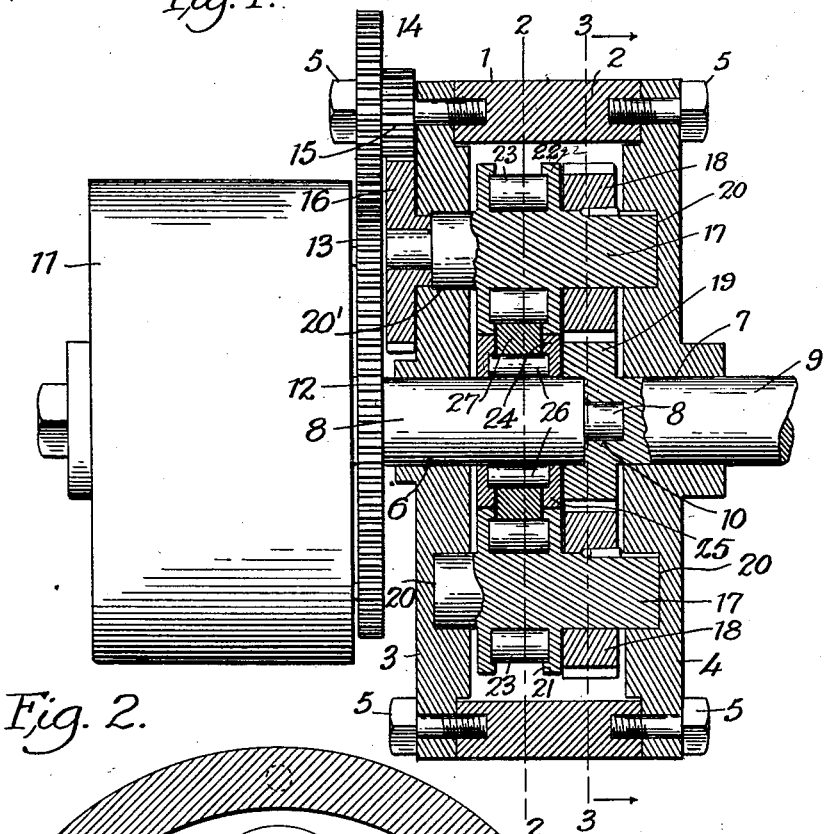
Fig. 1 is a view mainly in horizontal section, in the plane of the driving and driven shafts, through one form of power transmission mechanism embodying my invention.
Figure 2:
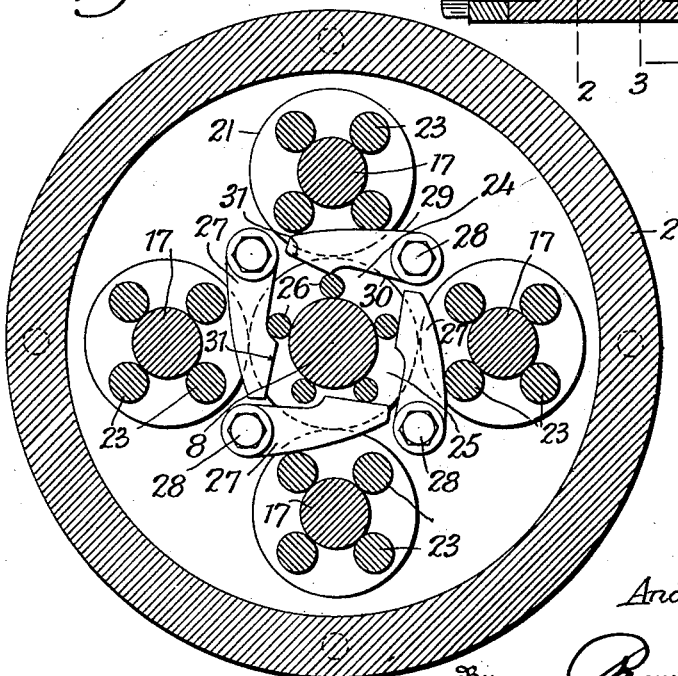
Fig. 2 is a vertical transverse section on line 2—2 of Fig. 1.
Figure 3:
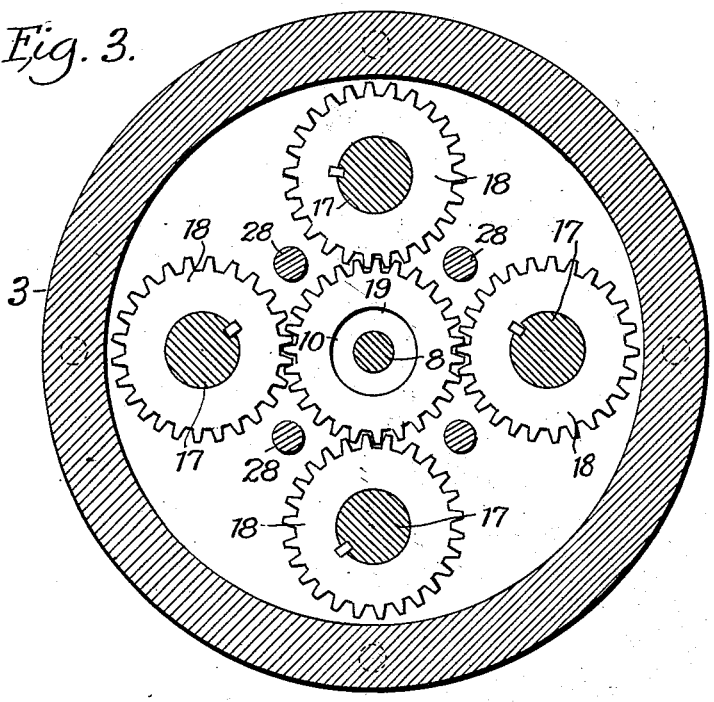
Fig. 3 is a vertical transverse section on line 3—3 of Fig. 1.
Figure 4:
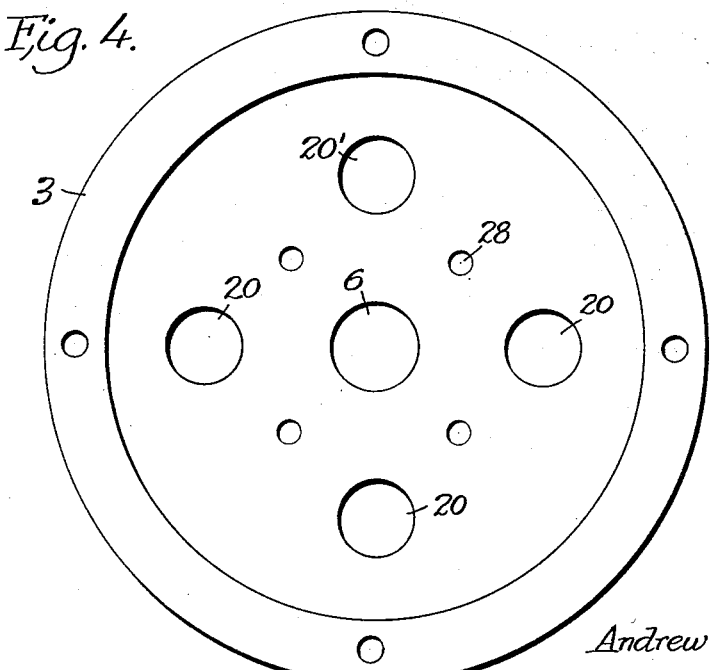
Fig. 4 is an inner face view of one of the side plates of the gear casing.

Referring now more particularly to the constructional example shown in Figs. 1 to 4, inclusive, 1 represents a gear casing of suitable form and size and comprising an annular body 2 closed by opposite side plates 3 and 4 secured thereto by machine screws or other suitable fastenings 5. Journaled in bearing openings 6 and 7 in the respective plates 3 and 4 are axially alined driving and driven shafts 8 and 9, the same having a stepped interbearing connection 10, whereby their working alinement is maintained. On shaft 8 is a driving element 11, which may be a driving motor or a pulley from which power is received from another shaft or motor, and shaft 9 may transmit the power directly or indirectly to gearing or machinery of any sort to be driven thereby. The shaft 8 is connected through a gear train 12, 13, 14 and 15 with a gear 16 on one of an annular series of transmission shafts 17 grouped about the shafts 8 and 9, which shafts 17 carry pinions 18 which are grouped about and mesh with a gear 19 on the shaft 9, whereby the shaft 9 is positively and continuously driven from the shaft 8 through the above-mentioned transmission gears.

The shaft of the group 17 which carries the gear 16 is journaled at one end in and extends outwardly through an opening 20' in the plate 3 to receive said gear, but the opposite end of the said shaft 17 is journaled in a bearing recess 20 in the plate 4 and the ends of all the other gears of the group 17 are journaled in similar recesses 20 in the plates 3 and 4 between which they extend.

On the shafts 17 are also crank wheels 21 equal in number to and corresponding in group arrangement to the gears. Each of these wheels 21 comprises a pair of spaced disks 22 of greater diameter than and projecting peripherally beyond the shafts 17 and carrying an annular series of anti-friction crank pins or rollers 23 mounted to rotate freely in bearing recesses in the disks. A similar driving crank wheel 24 formed of disks 25 carrying a series of drive pin cranks or rollers 26 is mounted on the shaft 8 and surrounded by the wheel group 21.

Arranged between the group of driven crank wheels 21 and the driving crank wheel 25 is an annular series of cam dogs or levers 27, each pivotally mounted at one end upon a pivot pin or bolt 28 for radial oscillating movement between the crank wheel 21 with which it coacts and the drive crank wheel 24. Each dog or lever 27 has an outer longitudinally curved or convex cam face 29 and a compoundly curved or inclined inner cam face composed of the relatively inner and outer surfaces 30 and 31. The surface 29 of the cam dog or lever is adapted for coaction with the anti-friction rollers 23 of the crank wheel 21 driven thereby while the surfaces 30 and 31 of said dog or lever are adapted for coaction with the anti-friction pins or rollers 26 of driving crank disk 24.

Each drive wheel 21 is shown as provided with four of the anti-friction rollers 23, which are more or less equidistantly arranged, and the drive wheel 24 is shown as provided with five of the pins or rollers 26, also more or less equidistantly arranged, such arrangement and the use of such numbers of rollers or pins on the driven and drive wheels providing for the power transmitting motion from the driving wheel to each driven wheel at regular periods and a proper phase action or timing of the movements of the dogs between adjacent driven wheels in the rotation of the driving wheel. Thus it will be evident from the showing in Fig. 2 that when a dog is in inactive position, its surface 30 is engaged by one of the pins 26, and that on a working movement of the dog in question the pin 26 passes from the surface 30 to the point of the dog between the surface 30 and inclined surface 31 of the dog and transmits outward radial movement to the dog during a portion of the orbit of rotation of the wheel 24. During this said portion of the orbit of rotation of the wheel 24 the surface 29 of the dog in question is in working engagement with one of the crank rollers 23 of the crank wheel 21 driven thereby, and accordingly a partial rotation is imparted to the said crank wheel 21, after which the acting pin 26 passes beyond the point of the dog and into engagement with the surface 31, which permits retraction of the dog, the next pin 26 of the series then coming into engagement with the surface 30 of the dog to support and hold the same against undue inward radial movement and to affect at a proper time period the succeeding outward working motion of the dog in the manner previously explained. The arrangement of the crank pins or rollers is also such that on each complete rotation of the wheel 24 a complete rotation is also imparted to each wheel 21, and that also on each rotation of the wheel 24 a constant succession of periodic working impulses are transmitted from the shaft 8 to the shaft 9, whereby the continuous power transmitting action of the toothed gearing is augmented or supplemented by the periodic motion transmitting impulses of the intermittent driving mechanism, by means of which a smooth and continuous driving of the shaft 9 is effected without any irregularities whatever due to looseness and slippage of teeth of the gearing of the continuous drive mechanism or torque or other causes producing loss of power in transmission. It is to be understood that the working impulses of the intermittent drive mechanism may be so timed that they will compensate for any lack, however imperceptible, which may occur in the motion transmitting action of the continuous driving mechanism, so that a most effective and highly efficient driving action of the shaft 9 is obtained without the losses incident to transmission gearing of ordinary types. Instead of employing the described number of crank pins or rollers on the crank wheels, any other suitable number and arrangement of the crank pins may be employed.

In Figs. 5 and 6 I have shown another form of my invention in which the continuous spur drive gearing between the drive and driven shafts is dispensed with and a direct driving action between said shafts substituted and in which the construction of the intermittent driving gearing is modified. As shown in this form of the invention the casing 1ª comprises an annular rim 2ª and side plates 3ª and 4ª, which side plates are provided with suitable bearing openings 6ª and 7ª for the driving and driven shafts 8ª and 9ª. Shaft 8ª is also journaled in a bearing opening 32 in a division or partition plate 33 rigidly fastened by bolts or other suitable connections 34 with a guide ring 35 to the plate 3ª. The end of the shaft journaled in the bearing 32 has an extension 36 which is journaled in a bearing opening in the shaft 9ª, and this shaft 9ª carries a gear 37 which meshes with gear pinions 38 on an annular series of crank shafts 39 journaled in bearings in the parts 3ª and 33, and which shafts 39 are operated in proper order or succession to transmit driving motion through the pinions 38 to the gear 37 and shaft 9ª.

On the shafts 39 are corners 40 which project inwardly between the parts 3ª and 33 and within a space or channel formed thereby beyond the outer periphery of the guide ring 35. The ring 35 is provided at proper intervals with guide openings for radially movable dogs 41 equal in number to the shafts 39. Each of these dogs 41 comprises a bar or shank having at its inner end a cam shoe 42 for coaction with a crank pin or roller 43 carried by and rotatable with the shaft 8ª and having at its outer end a cross head 44 for engagement with the crank 40 of the shaft 39 with which it coacts. The arrangement of the parts above-described is such that the crank pin or roller 43 carried by and revolving with the shaft 8ª comes in contact successively with the cam shoes of the dogs 41, as the shaft 8ª revolves, and forces each dog outwardly to the extent of a certain range of movement, after which the crank pin releases the dog and passes into engagement with the cam shoe of the next succeeding dog in its orbit of rotation. At the time each dog 41 is engaged for outward movement by the crank pin 43 the crank 40 of the coacting shaft 39 is arranged at a proper working angle to be engaged by the head 44 and given a certain arc of movement whereby the coacting pinion 38 is turned to impart a part revolution to the gear 37. The number and arrangement of the crank shafts and dogs and crank pin or pins on the driving shaft may be such as to transmit a desired number of working impulses to the shaft 9ª on each rotation of the shaft 8ª, which impulses will overcome any variations of movement between the shafts 8ª and 9ª due to torque, so that any fluctuations in the rotation of the shaft 9ª will be overcome and a very smooth working action of said shaft obtained, while at the same time the intermittent motion transmitting connections between the driving and driven shaft will have a booster action in strengthening and adding to the security of connection between the shafts, by which a very strong and powerful type of gearing in which the power transmitted may be regulated as desired is produced.

In Figs. 7, 8 and 9 I have shown still another form of my invention in which a direct driving connection between the driving and driven shafts is entirely dispensed with and a further modified type of intermittent drive mechanism employed in place of those previously described. As shown, the casing 1ᵇ here comprises an annular body portion 2ᵇ and side plates 3ᵇ and 4ᵇ, said plates having bearing openings 6ᵇ and 7ᵇ, respectively, in which the drive shaft 8ᵇ and driven shaft 9ᵇ are journalled. The end of the shaft 8ᵇ extending into the casing has a stepped bearing 10ª in the journal end of the shaft 9ᵇ, whereby said shafts are stably mounted and maintained in alinement. The inner end of the shaft 8ᵇ is also journaled in a bearing opening 32ª in a partition or division plate 33ª which is rigidly fastened by bolts 34ª to the side plate 4ᵇ of the casing.

Journaled in bearings in the plates 3ᵇ and 33ª are shafts 45 similar to the shafts 17 and provided with disks 46 forming crank wheels carrying crank pins 47, said shafts 45 also carrying spur gears 48 meshing with a spur gear 49 on the shaft 9ᵇ for transmitting motion to the latter. The crank pins 47 of the crank wheels 45 are adapted to be engaged by dogs 50 similar to the dogs 27 shown in Figs. 1 and 2 for transmitting motion thereto from a driving crank wheel 51 on the shaft 8ᵇ, which driving crank wheel is provided with an annular series of crank pins 52 arranged and operating at points in the orbit of rotation of the shaft 8ᵇ at fixed intervals to transmit working impulses to the gear 49 and shaft 9ᵇ. This construction and arrangement of the parts provides for a very compact and strong assemblage of the working parts in a transmission mechanism where the use of a rugged type of transmission mechanism is desired. This type of mechanism may be employed in the form disclosed for transmitting intermittent motion only, as set forth, but one of the shafts 45, as shown, may be extended exteriorly through the side plate 3ᵇ and provided with a tang or stem 53 of angular or other suitable form for mounting thereon of a gear which may be connected with a drive gear on the shaft 8ᵇ for the purpose of also securing a continuous driving action from the drive shaft to the driven shaft when the employment of such a driving arrangement is desired.

From the foregoing description, taken in connection with the drawings, the construction, mode of operation and advantages of my improved power transmitting mechanism will be readily understood and it will be seen that the invention provides a simple, reliable and efficient mechanism of this character by means of which power may be transmitted between driving and driven shafts to suit any degree of power and speed desired; that the invention provides for this purpose intermittent transmitting mechanism which may be regulated in arrangement or proportions and number of working parts to transmit working impulses at more or less frequent intervals and to regulate the acquired power and speed as desired; that the invention further provides for the use of a continuous drive gear in association with an intermittent drive gear whereby power losses incident to the use of the former may be overcome by the use of the latter.

Having thus fully described my invention, I claim :—

1. In a power transmitting mechanism, driving and driven shafts, gearing connected with the driven shaft, and intermittent motion transmitting mechanism between the drive shaft and gearing for actuating the latter.

2. In a power transmitting mechanism, driving and driven shafts, a gear on the driven shaft, a plurality of transmission gears meshing therewith, and intermittent mechanism actuated by the driving shaft for successively imparting intermittent motion to the transmission gears.

3. In a power transmitting mechanism, driving and driven shafts, gearing connected with the driven shaft, a driving crank on the driving shaft, and crank devices intermittently actuated successively by said crank for transmitting motion to said gearing.

4. In a power transmitting mechanism, driving and driven shafts, gearing for driving the driven shaft continuously from the driving shaft, and gearing for driving the driven shaft intermittently from the driving shaft.

5. In a power transmitting mechanism, a driving shaft, a driven shaft, a gear on the driven shaft, a plurality of intermittently driven gears for imparting motion thereto, means for continuously driving said gears from the drive shaft, and means for successively and intermittently driving said gears from the drive shaft.

6. In a power transmitting mechanism, a drive shaft, a driven shaft, a gear on the driven shaft, an annular series of gears meshing therewith, cranks for driving said gears, and intermittently operable members operated by the driving shaft for successively and intermittently operating said cranks.

7. In a power transmitting mechanism, a drive shaft, a driven shaft, gearing for driving the driven shaft, said gearing including a plurality of gear members, and crank mechanism actuated by the driving shaft for successively and intermittently operating said gear members.

8. In a power transmitting mechanism, a drive shaft, a driven shaft, spur gearing for driving the driven shaft, said gearing including an annular series of gear members, cranks for actuating said gear members, a crank on the driving shaft, and means actuated thereby for periodically and successively actuating the first-named cranks.

9. In a power transmitting mechanism, a drive shaft, a driven shaft, gearing for continuously driving the driven shaft from the drive shaft including a gear on the driven shaft and a plurality of gears meshing therewith, crank wheels connected with said gears, and crank actuated dogs receiving motion from the driving shaft for successively and intermittently actuating said crank wheels.

10. In a power transmitting mechanism, a drive shaft, a driven shaft, an annular series of shafts grouped about the drive shaft and driven shaft, a gear on the driven shaft, gears on the annular series of shafts meshing with said gear on the driven shaft, crank wheels on the group of shafts, and crank mechanism including radially movable dogs periodically operated by the driving shaft for actuating the crank wheels.

In testimony whereof I affix my signature.

ANDREW K. STOHL.